United States Patent
Kirrmann et al.

(10) Patent No.: US 9,106,595 B2
(45) Date of Patent: Aug. 11, 2015

(54) FRAME TRANSMISSION AND COMMUNICATION NETWORK

(71) Applicant: ABB RESEARCH LTD, Zürich (CH)

(72) Inventors: Hubert Kirrmann, Dättwil (CH); Jean-Charles Tournier, Bellegarde sur Valserine (FR)

(73) Assignee: ABB RESEARCH LTD, Zurich (CH)

( * ) Notice: Subject to any disclaimer, the term of this patent is extended or adjusted under 35 U.S.C. 154(b) by 83 days.

(21) Appl. No.: 13/741,857

(22) Filed: Jan. 15, 2013

(65) Prior Publication Data

US 2013/0128895 A1    May 23, 2013

Related U.S. Application Data

(63) Continuation of application No. PCT/EP2011/062400, filed on Jul. 20, 2011.

(30) Foreign Application Priority Data

Jul. 20, 2010   (EP) ..................... 10170127

(51) Int. Cl.
    *H04L 12/42*       (2006.01)
    *H04J 3/06*        (2006.01)
    (Continued)

(52) U.S. Cl.
    CPC .......... *H04L 49/9094* (2013.01); *H04L 12/403* (2013.01); *H04L 12/4015* (2013.01); *H04L 12/40156* (2013.01); *H04L 12/40182* (2013.01);
    (Continued)

(58) Field of Classification Search
    USPC ................................. 370/350, 412
    See application file for complete search history.

(56) References Cited

U.S. PATENT DOCUMENTS

| | | | |
|---|---|---|---|
| 8,595,014 B2 * | 11/2013 | Rychlik | 704/270 |
| 2005/0089067 A1 * | 4/2005 | Kinoshita et al. | 370/503 |

(Continued)

FOREIGN PATENT DOCUMENTS

| | | | |
|---|---|---|---|
| EP | 1 657 608 A1 | 5/2006 |
| EP | 1 734 700 A1 | 12/2006 |
| EP | 2 148 473 A1 | 1/2010 |

OTHER PUBLICATIONS

US 2011/0110359 A1 (U.S. Appl. No. 61/079,967).*

(Continued)

*Primary Examiner* — Edan Orgad
*Assistant Examiner* — Sithu Ko
(74) *Attorney, Agent, or Firm* — Buchanan Ingersoll & Rooney PC

(57) ABSTRACT

Exemplary embodiments are directed to a communication network interconnecting a plurality of synchronized nodes, where regular frames including time-critical data are transmitted periodically or cyclically, and sporadic frames are transmitted non-periodically or occasionally. For example, each node can transmit a regular frame at the beginning of a transmission period common to, and synchronized among, all nodes. Another node then receives regular frames from its first neighboring node, and forwards the frames within the same transmission period and with the shortest delay, to a second neighboring node. Furthermore, each node actively delays transmission of any sporadic frame, whether originating from an application hosted by the node itself or whether received from a neighboring node, until forwarding of all received regular frames is completed.

12 Claims, 3 Drawing Sheets

(51) Int. Cl.
    *H04L 12/861*   (2013.01)
    *H04L 12/40*    (2006.01)
    *H04L 12/403*   (2006.01)
    *H04L 12/413*   (2006.01)
    *H04L 12/43*    (2006.01)
    *H04L 12/801*   (2013.01)
    *H04L 12/853*   (2013.01)
    *H04L 12/851*   (2013.01)

(52) U.S. Cl.
    CPC .............. *H04L 12/413* (2013.01); *H04L 12/43* (2013.01); *H04L 47/10* (2013.01); *H04L 47/245* (2013.01); *H04L 47/2416* (2013.01); *H04L 2012/4026* (2013.01); *H04L 2012/40273* (2013.01)

(56) References Cited

U.S. PATENT DOCUMENTS

2006/0136604 A1    6/2006  Schultze et al.
2007/0223533 A1*   9/2007  Kirrmann et al. ............. 370/469
2011/0110359 A1*   5/2011  Cooke et al. .................. 370/350

OTHER PUBLICATIONS

International Search Report (PCT/ISA/210) issued on Aug. 29, 2011, by the European Patent Office as the International Searching Authority for International Application No. PCT/EP2011/062400.

Written Opinion (PCT/ISA/237) issued on Aug. 29, 2011, by the European Patent Office as the International Searching Authority for International Application No. PCT/EP2011/062400.

International Preliminary Report on Patentability (PCT/IPEA/409) issued on May 18, 2012, by the European Patent Office as the International Searching Authority for International Application No. PCT/EP2011/062400.

European Search Report dated Nov. 29, 2010.

Hanzalek Z., et al., "Profinet I0 IRT Message Scheduling", real-Time Systems, 2009, pp. 57-65.

* cited by examiner

FRAME TRANSMISSION AND COMMUNICATION NETWORK

RELATED APPLICATION(S)

This application is a bypass continuation under 35 U.S.C. §120 of International Application PCT/EP2011/062400 filed on Jul. 20, 2011, which claims priority to European application EP 10170127 filed in Europe on Jul. 20, 2010. The contents of which are hereby incorporated by reference in their entireties.

FIELD

The disclosure relates to an industrial communication system, such as industrial communication systems using Ethernet based communication networks for controlling time-critical processes in vehicle control, drive control, or Substation Automation.

BACKGROUND INFORMATION

Known process Control systems or Industrial Automation systems protect, control and monitor processes in industrial plants for e.g. manufacturing goods, transforming substances, or generating power. They also monitor and control extended primary systems like electric power, water or gas supply systems, or telecommunication systems, including their respective substations. An industrial automation system can have a large number of process controllers distributed in an industrial plant or over an extended primary system, and communicatively interconnected via an industrial communication system.

Substations in high and medium-voltage power networks include primary devices such as electrical cables, lines, bus bars, switching devices, power transformers and instrument transformers, which can be arranged in switch yards and/or bays. These primary devices are operated in an automated way via a Substation Automation (SA) system. The SA system includes secondary devices, so-called Intelligent Electronic Devices (IED), responsible for protection, control and monitoring of the primary devices. The IEDs may be assigned to hierarchical levels, such as the station level, the bay level, and the process level, where the process level is separated from the bay level by a so-called process interface. The station level of the SA system includes an Operator Work Station (OWS) with a Human-Machine Interface (HMI) and a gateway to a Network Control Centre (NCC). IEDs on the bay level, which may also be referred to as bay units, in turn are connected to each other as well as to the IEDs on the station level via an inter-bay or station bus serving the purpose of exchanging commands and status information.

A communication standard for communication between the secondary devices of a substation has been introduced as part of the standard IEC 61850 entitled "communication networks and systems in substations". For non-time critical messages, IEC 61850-8-1 specifies the Manufacturing Message Specification (MMS, ISO/IEC 9506) protocol based on a reduced Open Systems Interconnection (OSI) protocol stack with the Transmission Control Protocol (TCP) and Internet Protocol (IP) in the transport and network layer, respectively, and Ethernet as physical media. For time-critical event-based messages, IEC 61850-8-1 specifies the Generic Object Oriented Substation Events (GOOSE) directly on the Ethernet link layer of the communication stack. For very fast changing signals at the process level such as measured analogue voltages or currents IEC 61850-9-2 specifies the Sampled Value (SV) service, which like GOOSE builds directly on the Ethernet link layer (Layer 2 in OSI). Hence, the standard defines a format to publish, as multicast messages on an industrial Ethernet, event-based messages and digitized measurement data from current or voltage sensors on the process level.

The patent application EP-A 2148473 relates to mission-critical industrial automation applications, such as process or drive control systems, based on a ring-type communication network with a plurality of switching nodes and operating with full duplex links. Real-Time data communication for time-critical and availability-critical automation systems calls for both seamless resiliency against faults in the network and deterministic delivery of time-critical data. Seamless tolerance against link failures in the network can be provided by giving each node two communication ports and letting the nodes send frames with identical payload over both ports, as for instance specified in the standard IEC 62439-3 Clause 5 (termed High availability Seamless Redundancy (HSR). Hence, for each message to be sent on an exemplary ring network, a source and a duplicate frame are transmitted in opposite directions, both frames being relayed by the other nodes of the ring network until they eventually return back to the originating sender node. As a consequence, network load is roughly doubled with respect to a known ring network, but the destination node will receive the data after a maximum transmission delay that equals the longest possible path of the ring. In the fault-free state, the destination node thus receives two redundant frames with the same contents, with a certain time skew due to the fact that if one frame is received directly from the neighbour node, the other frame circulates around the entire ring. The redundant frames can be identified by a sequence number hence a node can detect duplicates and only forward the earlier or first frame of the two frames to its upper layer protocols and discards the later or second frame.

A deterministic transmission of data guarantees that the data are delivered in the fault-free state with a maximum delay between the moment they are ready for transmission at the source and the moment they are received by their final destination, in spite of possible communication errors or delays. A deterministic transmission of data specifies that sufficient bandwidth is pre-allocated. Each node is expected to transmit its data with a fixed length at a fixed frequency which is defined upon configuration of the entire network thus occupying a fixed portion of the bandwidth. A propagation delay when traveling along the transmission medium as well as a forwarding delay for crossing switches and easily exceeding the propagation delay have to be added to the duration of the frame itself. Hence, an exemplary worst-case occupancy of a transmission medium connecting 5 nodes, with each node transmitting at 1 kHz frames of 2500 bits at 100 Mbit/s plus 5 µs of propagation time (resulting in 30 µs duration per frame), is at least equal to $5 \times 30 \times 10^{-6} \times 10^{3} = 15\%$.

In real-time communication networks, such as IEC 61850-9-2, the traffic is carried by periodically sent R-frames, where "R" stands for "regular" or "real-time". By contrast, non-critical, soft real-time data are subject to relaxed timing constraints, and are expected to meet the delivery delays only with a certain probability. This non-critical traffic is carried by "S-frames", where "S" stands for "sporadic" or "soft-time". The minimum network capacity for R-frames can be estimated at engineering time, for instance from the Substation Configuration Description (SCD) file specified in IEC 61850. The SCD file indicates how often the time-critical frames SV and GOOSE should be transmitted and which size they have, and includes a communication subsection defining the topology of the network and the number of switches. However, the communication delays for R-frames may exceed the numbers computed at engineering time, since collisions take place within a switch and the R-frame, in spite of its higher priority, must be queued while an S-frame is being transmitted over the same medium.

Deterministic communication is traditionally provided by limiting the production rate in each node so that an overload is excluded, and in addition by regulating the traffic so that collisions are avoided, using for instance one of 1) a Time Division Multiplex Access (TDMA) slot allocation triggered by a common clock established before useful data communication can take place; 2) a central master polling the source addresses in a predefined sequence, as e.g. specified in IEC 61735; or 3) a master frame introduced by a master device that will be filled and read by all contributing devices, such as used be EtherCat. The latter two options are difficult to achieve where frames can be duplicated and may take different paths. Hence, the first method has been retained for HSR, providing a simple clock-based TDMA can get around configuring a central master or sending a dedicated master frame or other token.

PROFINET (Profibus.com) distinguishes between non real-time (NRT), real-time (RT), and Isochronous real-time (IRT) data. PROFINET IRT uses a combination of IEEE 1588, TDMA, and specialized switches to achieve hard real-time performance. Upon configuration of the network, the network topology and the data specified from each device are analyzed and cycles with a real-time period and a non-real-time period are defined. Each IRT device is assigned a time slot to communicate during the real-time period. Because all the IRT devices are synchronized using IEEE 1588, only one IRT device at a time sends packets. Switches with special ASICs buffer packets sent from non-IRT devices during the real-time period and transmit them during the non-real-time period.

SUMMARY

An exemplary method of transmitting frames in a communication network interconnecting a plurality of synchronized nodes is disclosed, wherein the nodes periodically transmit regular frames comprising time-critical data, and wherein the nodes non-periodically transmit sporadic frames, the method comprising: transmitting, by each node of the plurality of nodes, at the beginning of a common transmission period, a regular frame; receiving, by at least one node, regular frames from a first neighboring node, and forwarding within the common transmission period, the received regular frames to a second neighboring node, and delaying, by the at least one node, transmission of a sporadic frame until forwarding of all received regular frames is completed.

DESCRIPTION OF THE DRAWINGS

The subject matter of the disclosure will be explained in detail in the following text with reference to exemplary embodiments which are illustrated in the attached drawings, where.

DETAILED DESCRIPTION

Figure 1:
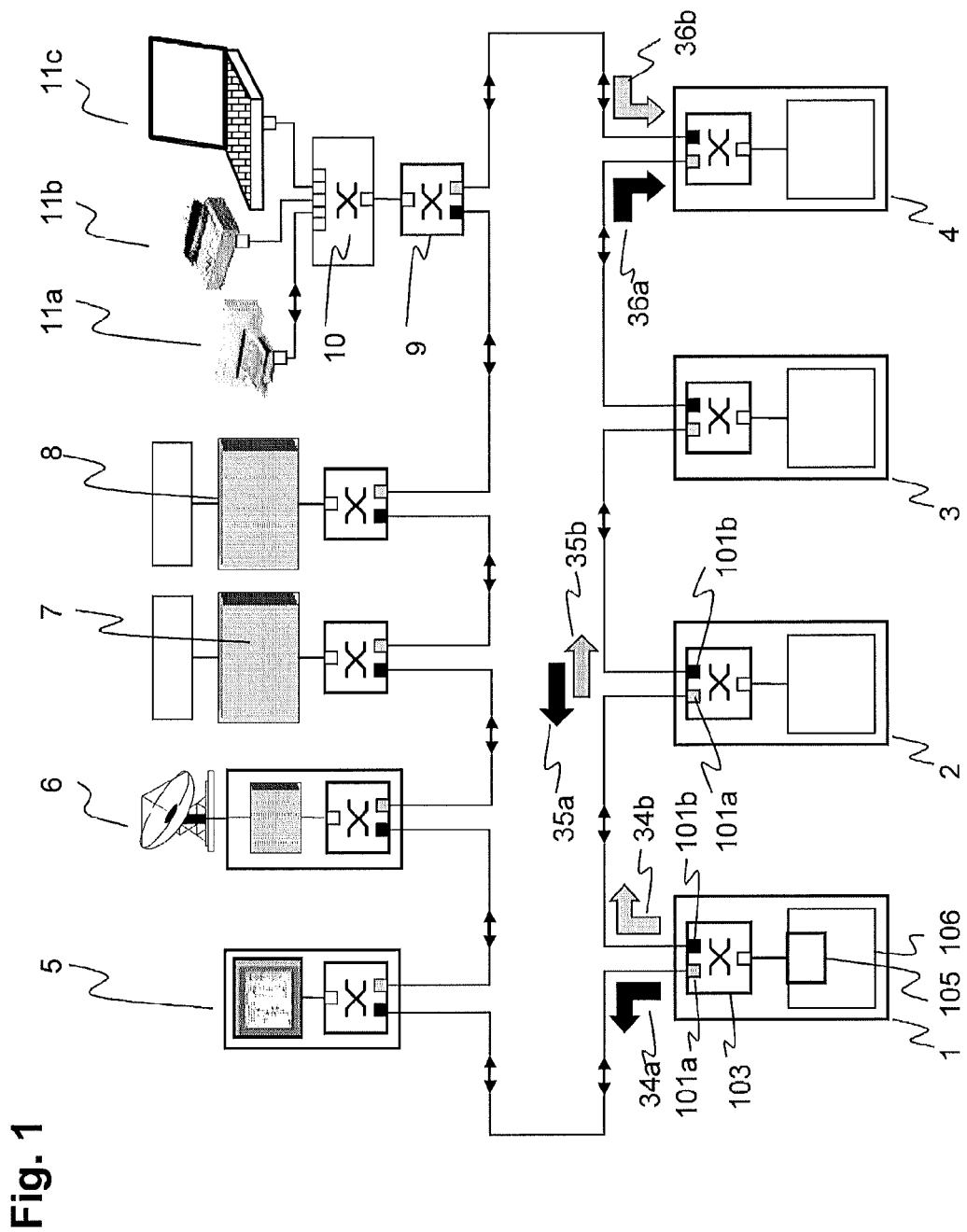
FIG. 1 illustrates a state-of-the-art automation network with a ring topology in accordance with an exemplary embodiment of the present disclosure.

Exemplary embodiments of the present disclosure provide for bandwidth-saving deterministic communication in a communication network, which can be achieved by performing a method of transmitting frames and using communication network disclosed herein.

According to an exemplary embodiment of the disclosure, in a communication network interconnecting a plurality of synchronized nodes, regular frames including time-critical data are transmitted periodically or cyclically, and sporadic frames are transmitted non-periodically or occasionally. For example, each node of the plurality of nodes transmits a regular frame at the beginning of a transmission period common to, and synchronized among, all nodes. A node then receives regular frames from its first neighboring node, and forwards them within the same transmission period and with the shortest delay, to a second neighboring node. Furthermore, the node actively delays transmission of any sporadic frame, whether originating from an application hosted by the node itself or whether received from a neighboring node, until forwarding of all received regular frames is completed.

In an exemplary embodiment of the disclosure, transmission of the sporadic frames is delayed until completion of a regular phase of predetermined length enabling transmission of any regular frame to its destination node. Alternatively, transmission of the sporadic frames is delayed until an end or completion of a regular phase is observed. By way of example, the regular phase is considered completed as soon as transmission of regular frames has been silent for a predetermined minimum mute time exceeding a standard inter-frame gap between two successive regular frames.

In an advantageous embodiment of the disclosure, the node verifies or checks, prior to transmission of the sporadic frame, whether the transmission of the latter may be completed before the start of the next transmission period. In the negative, transmission of the sporadic frame is delayed until the next transmission period.

According to IEC 62439 Clause 6 (Parallel Redundancy Protocol PRP) and IEC 62439-3 Clause 5 (HSR), each node has two communication ports and sends frames with identical payload over both ports. Without prejudice to arbitrarily meshed, matrix or tree topologies, an exempalry topology of IEC 62439-3 Clause 5 is a ring topology, in which a frame and a duplicate frame travel in opposite directions until they are removed by the source or destination node. In the context of the HSR protocol (IEC62439-3 Clause 5), the disclosure further takes advantage of the fact that a frame and its duplicate frame are identified as such based on a frame length included in a redundancy identifier of both frames. In this case, the decision whether or not to start transmission of a redundant sporadic frame is based on a frame length of the sporadic frame as read from its redundancy identifier.

In summary, transmission of regular frames by all nodes starts at a predetermined moment, and queued regular frames are forwarded or re-transmitted, by any node, in close succession, thus ensuring that the bandwidth is optimized and all regular traffic is expedited within the regular phase of the ongoing transmission period, and thus generating an interval of sufficient length for transmission of occasional sporadic frames before the start of the next transmission period.

FIG. 1 illustrates a state-of-the-art automation network with a ring topology in accordance with an exemplary embodiment of the present disclosure all switching nodes (1-9) within the ring, such as protection, control and measuring devices (1-4), supervision workstation (5), clock master (6), redundant telecontrol links (7, 8) as well as intermediary nodes (9) for non-ring devices (11a-11c) include a switch element (103) that is able to forward frames (35a, 35b) from one port (101a, 101b) to the other, ensuring circulation of frames round the ring. The switch element of a sender node (1) can inject a frame passed to it from the higher protocol layers (106) through the link layer entity (105) in either or both directions (34a, 34b). The switch element of a destination node (4) is capable of receiving frames (36a, 36b) from either direction of the ring and pass them to its own higher layer protocols. In HSR according to IEC 62439-3 Clause 5, a node always sends a frame received from its higher layer protocols over both its ports, the two duplicates of the frame circulate over the bus in opposite directions until they reach their original sender, and receivers pass only the earlier frame of a pair to their higher layer protocols and discard the duplicate.

Figure 2:
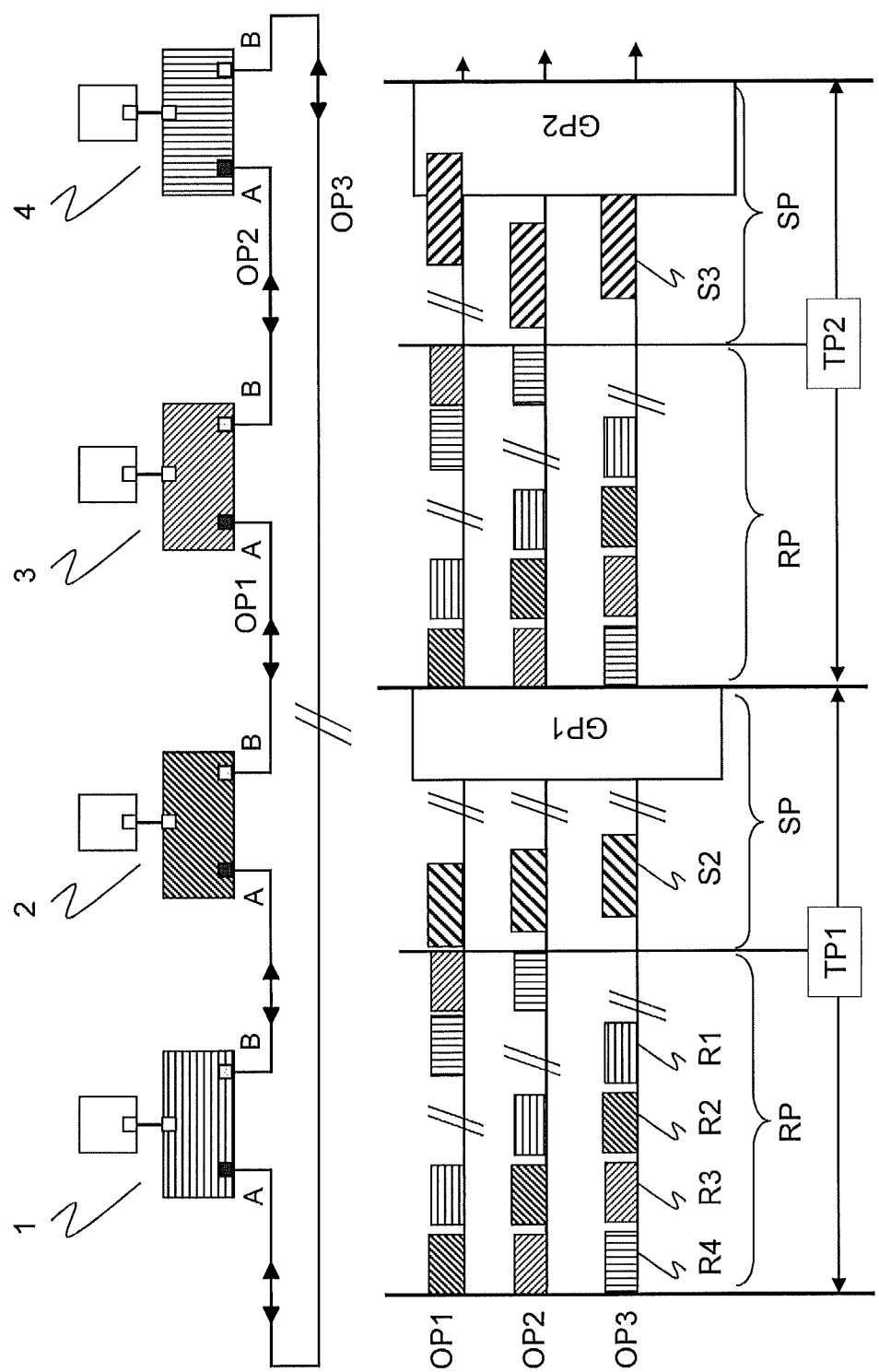
FIG. 2 illustrates the basic operation of a ring of four nodes in accordance with an exemplary embodiment of the present disclosure.

FIG. 2 illustrates the basic operation of a ring of four nodes in accordance with an exemplary embodiment of the present disclosure. At a common point in time derived e.g. from their synchronized clocks, all nodes send two R-frames with time-critical data received from a respective higher level application hosted by or connected to the node, via two respective ports (A, B) to two respective neighbor nodes. For the sake of legibility, the following example is limited to four R-frames (R1-R4) originally transmitted via port B of one of the four nodes (1-4), respectively. In the lower part of FIG. 2, these frames are depicted as rectangles and distinguished via vertical, oblique, and horizontal shading corresponding to the node of origin. All four nodes (1-4) transmit their time-critical data as R-frames (R1-R4) at the beginning of a Transmission Period TP or cycle. As a result, a node queues the frame received from its neighbor node while sending its own frame or any frame previously received. The queued R-frames are then sent, or re-transmitted, by the node in close succession, thus ensuring that the bandwidth is optimized and all R-traffic is expedited within the same transmission period. In the lower part of FIG. 2, three sequences of the four frames as observed within the transmission period at three different points (OP1-OP3) of the network are indicated. At the first observation point OP1 between node 2 and node 3, frame R2 is observed first, followed by frame R1 which had been previously sent from node 1 to node 2 and queued at node 2 while frame R2 was being transmitted. With some delay due to the longer transmission path, frames R4 and R3 follow at OP1 and conclude a Regular or periodic Phase RP of the transmission period. At the second point of observation OP2 between node 3 and node 4, the order of the frames is different, with frame R3 being observed first, followed by frames R2 and R1, and finally by frame R4. At the third observation point OP3 between node 4 and node 1, the order of the frames is R4-R3-R2-R1. In the next transmission period TP2, the order of the R-frames circulated during this TP and observed at OP1 to OP3 is the same as in the previous period TP1.

Following re-transmission, at each of the four nodes, of the last one of the four R frames, the regular phase for regular or real-time frames is terminated, and a Sporadic Phase SP for sporadic frames ensues. The beginning of the sporadic phase may be pre-determined based on the number, length, and propagation delay of the R-frames transmitted during the regular phase, or may be triggered by an R-frame queue at a node being empty for a minimum time delay. The aforementioned queuing of R-frames at all nodes generates a continuous slot for the sporadic or a-periodic messages at the end of the transmission period. Accordingly, every node actively precludes S-frames received during the regular phase from a higher level application, from being transmitted before the end of the regular phase. In FIG. 2, first transmission period TP1, S-frame 82 originating from node 2 is observed at the beginning of the sporadic phase at observation point OP1. As S2 is being forwarded by node 3 in a "cut-through" mode with minimum delay, S2 is observed soon after at OP2 and OP3. In the sporadic phase of the next transmission period TP2, node 3 transmits sporadic frame S3, which is then observed, in this order, at observation points OP2, OP3, OP1.

Furthermore, maintaining the period for the R-frames specifies that an S-frame cannot be transmitted unless there is sufficient time to complete this transmission before the next regular phase begins. If an S-frame is received by a node during a Sporadic Phase SP for transmission, where the length of this S-frame does not permit to finalize transmission during the remaining part of the sporadic phase, it is delayed until the beginning of the sporadic phase of the next transmission period. The length of the sporadic phase thus has to be chosen to provide sufficient time to transmit the longest possible S-frame. As a drawback, this prevents utilizing the bandwidth to 100%. If S-frames are classified according to their length, a class-wise virtual Guard Phase GP may be introduced at the end of each sporadic phase, during which no transmission of a corresponding S frame is initiated. This is shown in FIG. 2, where the guard phase GP1 in TP1 matches the length of S2, which implies that no S-frame with the same length as S2 is released for transmission during GP1. In TP2, the re-transmission of S3 by the ultimate node 2 in the ring starts before GP2, but only completes during GP2. In any case, no transmission or forwarding of an S-frame, by any node of the network, is ongoing at the start of a regular phase. Accordingly, an interruption of the transmission of S-frames can be avoided.

As the size of the frames is normally not available in the header of an Ethernet frame, the S-frames are placed into a store-and-forward buffer to compute their size. However, frames according to the HSR protocol carry a length field in their header, and therefore their length can be indicated precisely without previous buffering. In any case, the sending port determines the length of the frame and decides to send it right away or only in the next sporadic phase.

As a numerical example for the throughput, assuming that each node sends a minimum length frame of 64 octets, equivalent to 64*8=512 bits or 5 µs at a network speed of 100 Mbit/s (or 0.5 µs at 1 GBit/s) with an inter-frame spacing at a minimum of 0.96 µs. A non-time critical frame (S frame) such as a TCP/IP frame can take up to 1522 octets and last some 122 µs (or 12.2 µs at 1 GBit/s). With a base period of 250 µs corresponding to a highest sending frequency of 4 kHz (or 25 µs and 40 kHz at 1 GBit/s), there is sufficient space for one maximum length S-frame and R-frames from 21 devices. Using 61850-9-2 SMV maximum size frames (160 octets) reduces the highest sending frequency to 2.5 kHz (25 kHz at 1 GBit/s).

Figure 3:
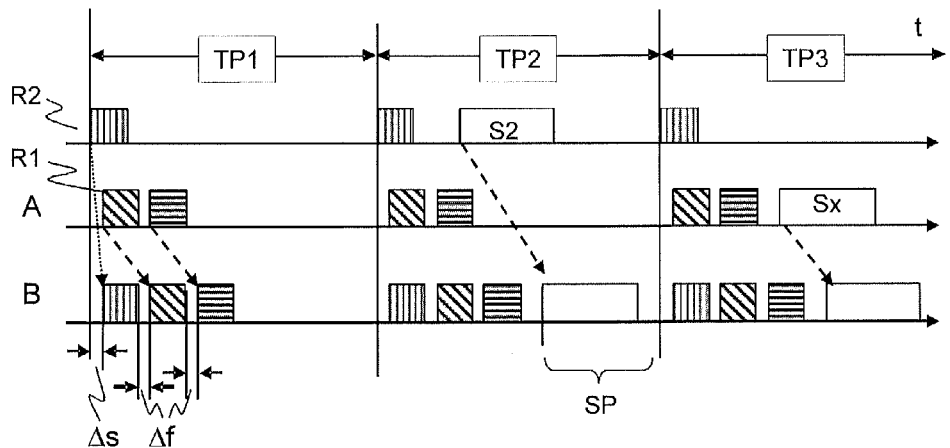
FIG. 3 illustrates a succession of frames at different locations within a node in accordance with an exemplary embodiment of the present disclosure.

FIG. 3 illustrates a succession of frames at different locations within a node in accordance with an exemplary embodiment of the present disclosure. For example, FIG. 3 illustrates a succession of frames at different places within exemplary node 2. The top line depicts the frames ready for sending at the next periodic phase, while the second line depicts the frames received by the in-port of the node (port A), and the bottom line depicts the frames at the out-port (port B). The node's domestic frame R2 is forwarded to port B with a certain send delay As. Since the time to send a frame (12 µs) is long with respect to the propagation time between two nodes (1 µs, corresponding to a distance of 200 m), the R-frame R1 of the neighboring node 1, triggered at that same time by the common clock, will arrive at node 2 while this node is transmitting its own R-frame R2. The node then appends frame R1 to its own frame R2 with the minimum inter-frame gap Δf (0.96 μs at 100 Mbit/s). The same happens to all subsequently received R-frames, thus building a train of R-frames with a minimum inter-frame gap.

In TP2, a domestic sporadic frame S2 received from an application hosted by that node is ready for sending before the start of the sporadic phase SP, and is correspondingly delayed until the start of the period. The end of the periodic phase can be determined by observing a first minimum-size inter-frame gap since the start of the periodic phase, or by calculating the maximum length of the periodic phase. In TP3 finally, a sporadic frame Sx is received too early as a consequence of some error and correspondingly delayed until the start of a sporadic phase.

Figure 4:
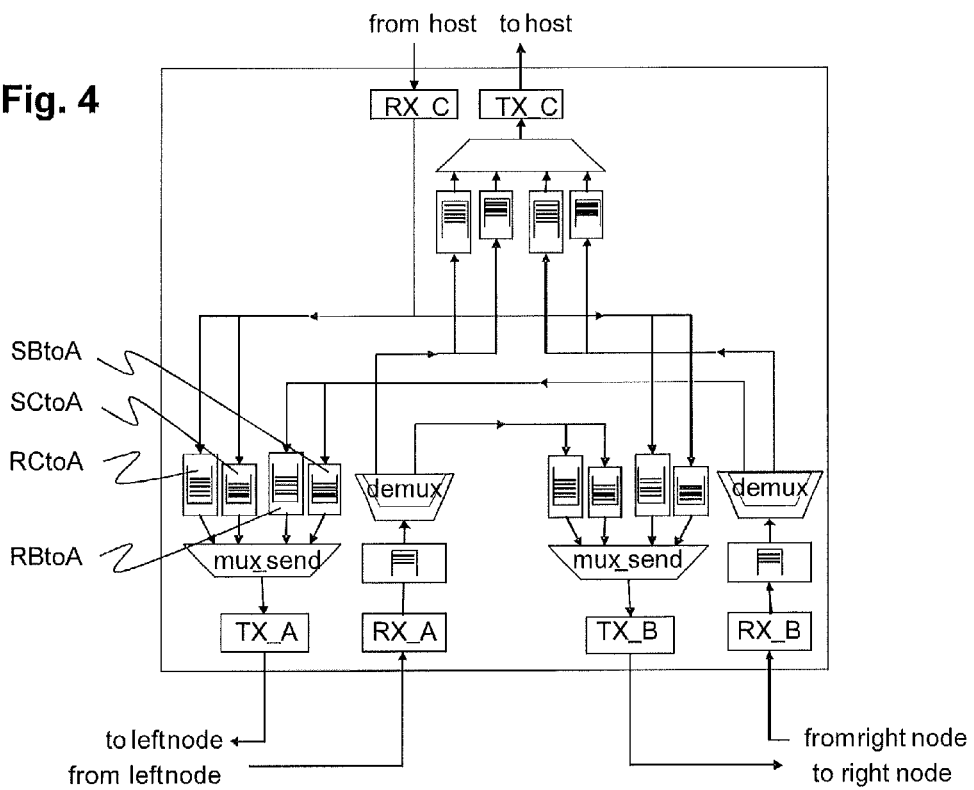
FIG. 4 illustrates a node structure of an exemplary switching node.

FIG. 4 illustrates a node structure of an exemplary switching node. Each node is assumed to distinguish the traffic of the high-priority R-frames for which determinism is to be provided from the traffic of the lower priority S-frame for which soft real-time response is sufficient. To this effect, a node has distinct queues for the two kinds of frames, as depicted in FIG. 4. Since queues in hardware cannot be accessed simultaneously by different writers, at each sending port a distinct pair of R and S queues is used for each source. For instance, the transmitter TX_A at sending port A is fed from an S-queue SBtoA where S-frames received via port B a queued, S-queue SCtoA where S-frames from the hosted application are queued, R-queue RBtoA where R-frames received via port B a queued, as well as R-queue RCtoA where R-frames from the hosted application are queued. When the clock indicated the beginning of a regular period, sending time to transmit an R-frame, the transmitter TX_A at sending port A collects the R-frames from its R-queues RCtoA and RBtoA for instantaneous transmission.

The exemplary method assumes that a common clock for all nodes exists with an accuracy of about 1 μs, synchronized through suitable means, such as GPS, PPS or IEEE 1588 as desired. In the latter case, each node implements a hybrid clock that is both ordinary and transparent and resynchronizes the local clocks according to IEEE 1588.

When the R-frames have been transmitted, the node can send S-frames. A node knows that the time-critical phase is over when both the input queue and output queue is void for a time longer than the inter-frame spacing or gap Δf. This allows emptying the S-frame queue during the sporadic phase. The periodic phase must be engineered so that there is always sufficient place for at least one S-frame.

Finally, the present disclosure can be used without further modification to couple several ring-type communication networks, e.g. by means of quadboxes according to IEC 62439-3 Clause 5 as detailed in EP-A 2148473. In this case, the domestic frames of the quadbox (corresponding to the frames from the hosted application in the above example) actually pertain to a neighboring ring.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method of transmitting frames in a communication network interconnecting a plurality of synchronized nodes of a Process Control (PC) or Substation Automation (SA) system, wherein the nodes periodically transmit regular frames comprising time-critical data, and wherein the nodes non-periodically transmit sporadic frames, the method comprising:

transmitting, by each node of the plurality of nodes of the Process Control (PC) or Substation Automation (SA) system, at the beginning of a common transmission period, a regular frame;

receiving, by at least one node of the Process Control (PC) or Substation Automation (SA) system, regular frames from a first neighboring node, and forwarding within the common transmission period, the received regular frames to a second neighboring node, and delaying, by the at least one node of the Process Control (PC) or Substation Automation (SA) system, transmission of a sporadic frame until forwarding of all received regular frames is completed, wherein the communication network is a ring, comprising:
transmitting, by a node of origin, a frame and a duplicate frame to a first and second neighboring node, respectively, with the frame and the duplicate frame being identified by means of a redundancy identifier, and wherein the redundancy identifier comprises the length of the frame, comprising: verifying, by the node of origin and prior to transmission of a sporadic frame or a duplicate sporadic frame, whether the transmission of the sporadic frame or of the duplicate sporadic frame can be completed before the start of the next transmission period, based on the redundancy identifier comprising the length of the frame.

2. The method according to claim 1, comprising:
delaying transmission of the sporadic frame until an end of a regular phase dedicated to the transmission of regular frames is observed.

3. The method according to claim 1, comprising:
verifying, by the at least one node and prior to transmission of the sporadic frame, whether the transmission of the sporadic frame can be completed before the start of the next transmission period.

4. The method according to claim 1, comprising:
queuing, by the at least one node, a regular frame received from the first neighboring node and to be forwarded to the second neighboring node in a regular queue; and
queuing, by the at least one node, a regular frame from an application hosted by the node and to be transmitted to the second neighboring node in a different queue.

5. A communication network, comprising:
a plurality of interconnected and synchronized nodes of a Process Control (PC) or Substation Automation (SA), system, wherein at least one node periodically transmits regular frames comprising time-critical data, and wherein at least one node non- periodically transmits sporadic frames, each node of the network comprising:

means for transmitting, at the beginning of a common transmission period, a regular frame, receiving regular frames from a first neighboring node of the Process Control (PC) or Substation Automation (PC) system, and for forwarding, within the common transmission period, the received regular frames to a second neighboring node; and means for delaying transmission of a sporadic frame until forwarding of all received regular frames is completed, wherein the communication network is a ring with a frame and a duplicate frame being sent, by a node of origin, to a first and second neighboring node, respectively, and with the frame and the duplicate frame being identified by means of a redundancy identifier, and wherein the redundancy identifier comprises a length of the frame, and wherein each node of the network comprises means for verifying, prior to transmission of a sporadic frame or a duplicate sporadic frame, whether the transmission of the sporadic frame or of the duplicate sporadic frame can be completed before a start of the next transmission period, based on the redundancy identifier comprising the length of the frame.

6. The communication network according to claim 5, wherein each node in the network comprises means for delaying transmission of the sporadic frame until an observed end of a regular phase is observed.

7. The communication network according to claim 5, wherein each node of the network comprise means for verifying, prior to transmission of the sporadic frame, whether the transmission of the sporadic frame can be completed before the start of the next transmission period.

8. The communication network according to claim 5, wherein each node pertains to an Intelligent Electronic Devices (IED) of the Process Control (PC) or Substation Automation (SA) system.

9. The communication network according to claim 6, wherein each node pertains to an Intelligent Electronic Devices (IED) of the Process Control (PC) or Substation Automation (SA) system.

10. The communication network according to claim 7, wherein each node pertains to an Intelligent Electronic Devices (IED) of the Process Control (PC) or Substation Automation (SA) system.

11. The communication network according to claim 5, wherein each node pertains to an Intelligent Electronic Devices (IED) of the Process Control (PC) or Substation Automation (SA) system.

12. The communication network according to claim 5, wherein each node pertains to an Intelligent Electronic Devices (IED) of the Process Control (PC) or Substation Automation (SA) system.

* * * * *